(12) United States Patent
Marques Correia et al.

(10) Patent No.: US 10,867,137 B2
(45) Date of Patent: Dec. 15, 2020

(54) PASSIVE SENSOR SYSTEM POWERED BY WIRELESS ENERGY TRANSMISSION

(71) Applicants: UNIVERSIDADE DE AVEIRO, Aveiro (PT); INSTITUTO DE TELECOMUNICAÇÕES, Aveiro (PT)

(72) Inventors: Ricardo João Luís Marques Correia, Aveiro (PT); Nuno Borges De Carvalho, Aveiro (PT)

(73) Assignee: UNIVERSIDADE DE AVEIRO, Aveiro (PT)

( * ) Notice: Subject to any disclaimer, the term of this patent is extended or adjusted under 35 U.S.C. 154(b) by 0 days.

(21) Appl. No.: 16/466,883

(22) PCT Filed: Dec. 5, 2017

(86) PCT No.: PCT/IB2017/057660
§ 371 (c)(1),
(2) Date: Jun. 5, 2019

(87) PCT Pub. No.: WO2018/104865
PCT Pub. Date: Jun. 14, 2018

(65) Prior Publication Data
US 2019/0347450 A1    Nov. 14, 2019

(30) Foreign Application Priority Data
Dec. 5, 2016    (PT) .......................... 109779

(51) Int. Cl.
*G06K 7/00*    (2006.01)
*H04B 5/00*    (2006.01)

(52) U.S. Cl.
CPC ......... *G06K 7/0008* (2013.01); *H04B 5/0037* (2013.01); *H04B 5/0043* (2013.01)

(58) Field of Classification Search
CPC ........... G06K 7/10366; G06K 7/10316; G06K 7/10009; G06K 19/0723; G06K 7/10356;
(Continued)

(56) References Cited

U.S. PATENT DOCUMENTS

2014/0085051 A1    3/2014  Gudan et al.
2019/0347450 A1*  11/2019  Marques Correia ........................ H04B 5/0037

OTHER PUBLICATIONS

Correia Ricardo et al, "Continuously Power Delivering for Passive Backscatter Wireless Sensor Networks", IEEE Transactions on Microwave Theory and Techniques, Nov. 3, 2016 (Nov. 3, 2016), pp. 3723-3731, vol. 64, No. 11, Plenum, USA.

* cited by examiner

*Primary Examiner* — Edwin C Holloway, III
(74) *Attorney, Agent, or Firm* — Leason Ellis LLP

(57) ABSTRACT

A passive sensor network constituted by a reader (5), wireless energy emitters (2), and fully passive sensors (1) is described. The passive sensors allow continuously the data collection and transfer thereof whenever requested by the reader, via backscatter at a frequency (4), and in parallel the reception of energy from the transmitters (3). Each sensor integrates an antenna, two impedance matching networks, a semiconductor, a microcontroller and one or more sensors that do not require the use of their own power supply or batteries. The reader (remote unit) initiates the communication process. This communication is achieved by sending radio frequency commands recognized by the passive sensors. These sensors, upon receiving the commands from the reader, initiate the back transmission of data according to the received command. The power transmitters are used to allow continuous power supply of the passive sensors.

13 Claims, 4 Drawing Sheets

(58) Field of Classification Search
CPC ............. G06K 19/0717; G06K 7/0008; G06K 7/10128; G06K 7/10257; G06K 19/07749; G06K 7/086; G06K 7/10148; G06K 19/0726; H04B 5/0025; H04B 5/0031; H04B 5/0037; H04B 5/0043
USPC ...................................................... 340/10.1
See application file for complete search history.

PASSIVE SENSOR SYSTEM POWERED BY WIRELESS ENERGY TRANSMISSION

CROSS-REFERENCE TO RELATED APPLICATIONS

This application is a U.S. National Stage Application under 35 U.S.C. § 371 of International Patent Application No. PCT/IB2017/057660, filed Dec. 5, 2017 which claims priority to Portugal Patent Application No. 109779, filed Dec. 5, 2016, the contents of which are each hereby incorporated by reference in their respective entireties.

TECHNICAL FIELD

The present disclosure relates a network of passive sensors which communicate with the reader via backscatter and which, simultaneously, can be powered by energy emitters, allowing the continuous recording of sensor data.

BACKGROUND

Document U.S. Pat. No. 6,100,790 discloses a system using two circuits, one for data communication and the other for power reception. This system has a selective distribution for power communication or reception. The selection of which system to use is based on the power level of the radio frequency (RF) signal. Depending on the level the distribution is made to either the power reception circuit or to the data communication system.

Document U.S. Pat. No. 6,084,530 discloses a radio communication system which includes an interrogator which generates and transmits an RF signal. The system includes one or more tags, which modulate, through backscatter, the wave transmitted forming a reflected modulated wave which is subsequently demodulated in the interrogator.

The document U.S. Pat. No. 8,552,597 discloses a scheme for a passive wireless sensor by collecting RF energy from the environment. Said patent refers to a scheme which may include a local energy supply and which may include a radio system. The energy collected through the RF waves can be stored in a super capacitor and depending on the energy level collected, it may use the local energy supply or activate a low power state to transmit data.

These facts are disclosed in order to illustrate the technical problem addressed by the present disclosure.

GENERAL DESCRIPTION

A passive sensor network constituted by a reader (5), wireless energy emitters (2), and fully passive sensors (1) is described. The passive sensors allow continuously the data collection and transfer thereof whenever requested by the reader, via backscatter at a frequency (4), and in parallel the reception of energy from the transmitters (3). Each sensor integrates an antenna, two impedance matching networks, a semiconductor, a microcontroller and one or more sensors that thus do not require the use of their own power supply or batteries. The reader (remote unit) initiates the communication process. This communication is achieved by sending radio frequency commands recognized by the passive sensors. These sensors, upon receiving the commands from the reader, initiate the back transmission of data according to the received command. The power transmitters are used to allow continuous power supply of the passive sensors.

The present disclosure relates to a passive sensor system which does not require the use of cells or batteries. To this end, we resort to the implementation of sensors that have a unique identification, which sensors use a frequency for data transfer (obtained by the sensors) and another frequency for the reception of energy by the transmitters.

When compared to traditional systems (passive sensors that use cells or batteries), said passive sensor system represents innumerous advantages, the main being the lack of batteries. Two fundamental factors in the use of this passive sensor system are the convenience and the saving that is guaranteed to the user and the environmental impact in the absence of batteries.

The present disclosure is also distinguished by the way in which the communication is performed (backscatter), in a totally passive manner, and by the possibility of simultaneously performing the communication at a frequency and the reception of energy at a different frequency.

The present disclosure also distinguishes itself by having an energy transmitter to continuously power the tag (part of the sensor or sensors system) so that it can transmit data. The tag may include several different low-power sensors, depending on the intended application. In order to increase the communication range, the tag proposed in the present disclosure can be produced for several different types of modulations.

The present disclosure further distinguishes itself by allowing the transmission of data in a passive (without battery) and continuous mode, via backscatter and energy emitters: passive sensors that communicate with a reader via backscatter and which are continuously powered by wireless energy emitters.

A passive sensor system is described as follows:
Each passive sensor has an unique identifier assigned by the user;
The sensor also has two impedance matching networks so that the sensor can operate at two different frequencies (one for transferring data and another for receiving energy);
Each sensor has a microcontroller that receives information from one or more sensors (temperature, humidity, pressure, etc.) and based on this information controls a semiconductor that changes the reflection coefficient of the sensor in order to communicate with the reader;
Each sensor has a voltage multiplier with N stages, in order to receive sufficient energy from the energy emitter for powering the microcontroller and the sensors connected thereto.

The present disclosure is useful for controlling temperature and humidity inside houses, as well as for measuring soil moisture in agricultural fields. The applications can be several, depending on the sensors attached to the passive sensor.

The present disclosure relates to one or more passive sensors that can be arranged in a certain interior space or arranged outdoors. Each passive sensor can transmit the data collected by the microcontroller whenever requested by the reader.

The sensors do not require battery for operation, having an unlimited lifetime from an operational point of view.

The sensor contains an identifier, which may be a code or another alternate system that can be transmitted together with the data using a wireless system. Some examples include a binary code, a given frequency or phase, differences in mismatch, or differences in voltage levels. For each type of sensor, there is a convenient reader capable of analyzing its identification and transmitted data based on these characteristics.

The energy emitter consists of a signal generator, that is, a local oscillator that continuously generates a wave at the operating frequency. This signal is preferably properly amplified, through a high efficiency power amplifier, which supplies the transmitting antenna. The transmitting antenna preferably presents high directivity and the possibility of beam steering by means of antenna arrays, allowing focusing the energy towards the passive sensors. The number of transmitters depends on the number of receivers and arrangement thereof. In addition to the continuous wave scenario, alternative waveforms are exploited in order to optimize wireless energy transfer.

The reader can preferably be implemented using two approaches designated herein by Conventional and All-Digital approach: The Conventional approach consists of an emitter/receiver based on an I/O (in-phase and quadrature) architecture. In this approach the I/O signals are generated in baseband (BB) or an intermediate frequency (IF) through a processing unit (Microprocessor, DSP, FPGA) and, in the transmission chain, are converted to RF with the use of digital-to-analog (D/A) converters, followed by a signal mixer. In the receiving chain the signal is translated to BB or IF through a mixer, followed by analog-to-digital (A/D) converters. In the All-Digital approach the emitter/receiver is based on a software-defined radio (SDR) architecture where signal processing functions, such as modulators, demodulators, filters, among others, are implemented in reconfigurable digital software or hardware. In this approach, in the transmission, the signal in BB is converted directly to RF in the digital domain using high-speed serializers and with de-serializers for reception. In both approaches the implementation of amplification and signal filtering stages is necessary.

It is disclosed a passive node for wireless sensor network, comprising:
antenna for data communication and electromagnetic energy reception for obtaining electrical energy for powering said node;
two impedance matching networks attached to said antenna; and
data processor configured to transmit data and powered by the obtained electric energy;
wherein said antenna and impedance matching networks are configured for two distinct frequencies, one network for receiving electromagnetic energy emitted from one electromagnetic energy emitter and another network for backscatter communication.

An embodiment comprises a semiconductor for modulation control by said data processor.

An embodiment comprises a plurality of semiconductors for modulation control by said data processor in balanced impedance stages.

An embodiment comprises a plurality of semiconductors for modulation control by said data processor in balanced and out-of-phase impedance branches.

An embodiment comprises a plurality of semiconductors for modulation control by said data processor configured to be activated at different voltages to obtain different types of modulations.

An embodiment comprises a voltage multiplier for multiplying the voltage of the obtained electric energy.

In an embodiment, said node is a sensor node and comprises a transducer connected to said data processor.

In an embodiment, said transducer is a temperature, humidity, pressure transducer, or combinations thereof.

In an embodiment, the data processor is a microprocessor or a microcontroller.

In an embodiment, said antennas and networks are configured to communicate and/or receive electromagnetic energy at 2.45 GHz or at 5.8 GHz.

A wireless sensor network comprising an electromagnetic energy emitter and a plurality of passive nodes according to one or more nodes of any said nodes, or combinations thereof, is further described.

In an embodiment, the electromagnetic energy emitter comprises a transmitting antenna with a directed transmission profile.

In an embodiment, the transmitting antenna of the electromagnetic energy emitter is also a receiving antenna of the data transmitted by the passive node or nodes.

In an embodiment, the electromagnetic energy emitter is configured to emit in a continuous, periodical, or predefined transmission regime.

In an embodiment, each of the passive nodes comprises a unique identification in the sensor network.

BRIEF DESCRIPTION OF THE DRAWINGS

The following figures provide preferred embodiments for illustrating the description and should not be seen as limiting the scope of invention.

DETAILED DESCRIPTION

Figure 1:
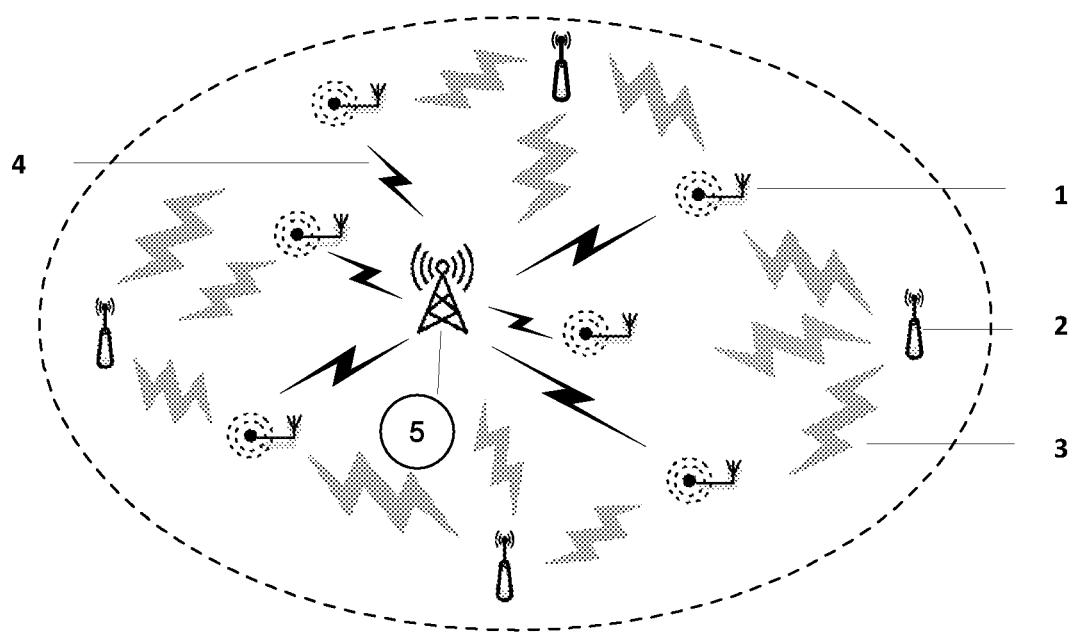
FIG. 1: Diagram illustrating the passive sensor network.
Figure 2:
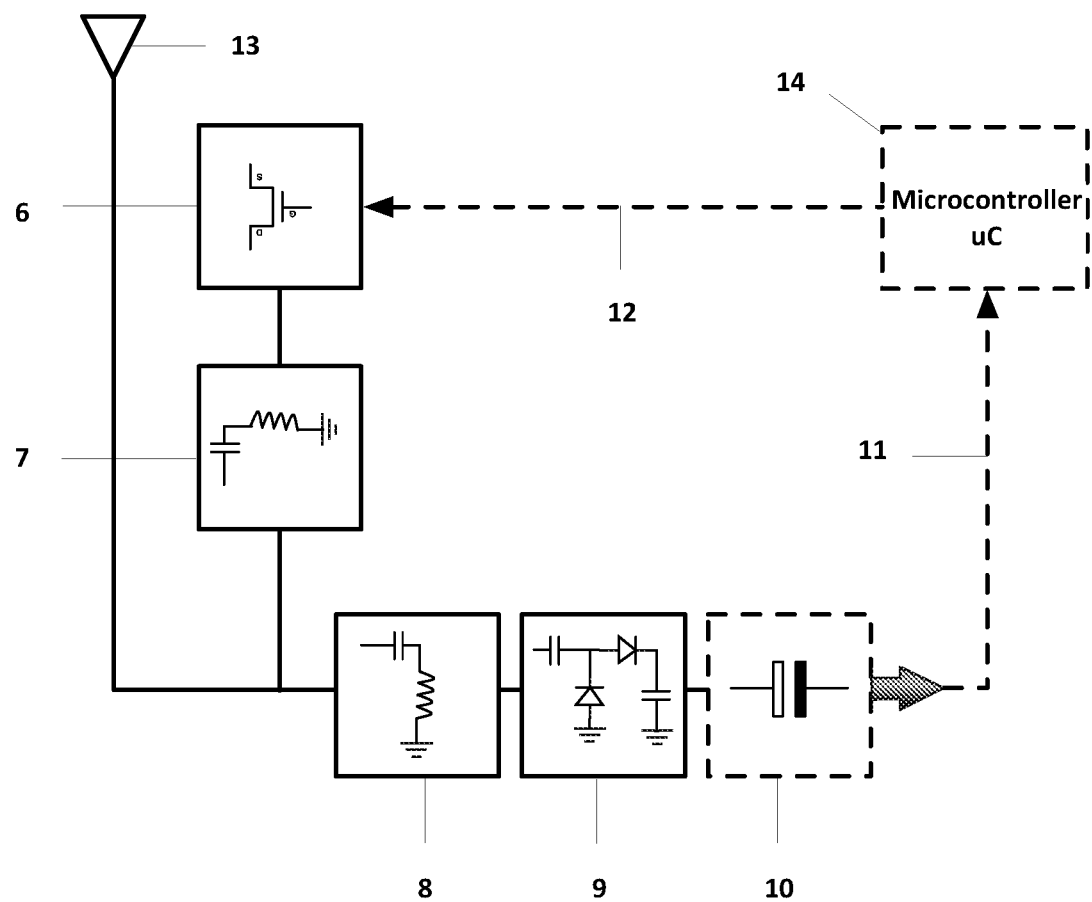
FIG. 2: Schematic of passive sensor elements.
Figure 3:
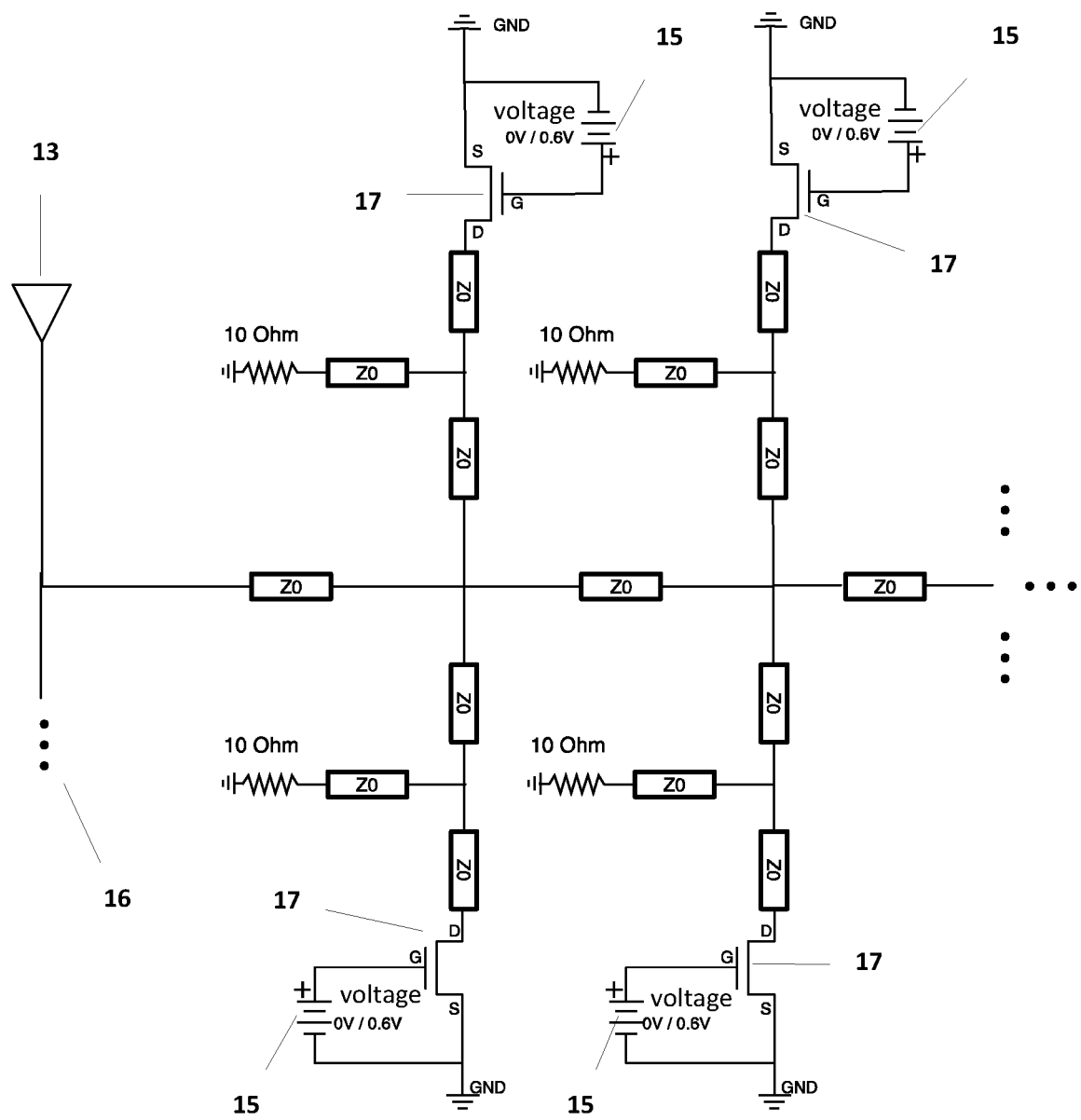
FIG. 3: Increase in the modulation order of the passive sensor.
Figure 4:
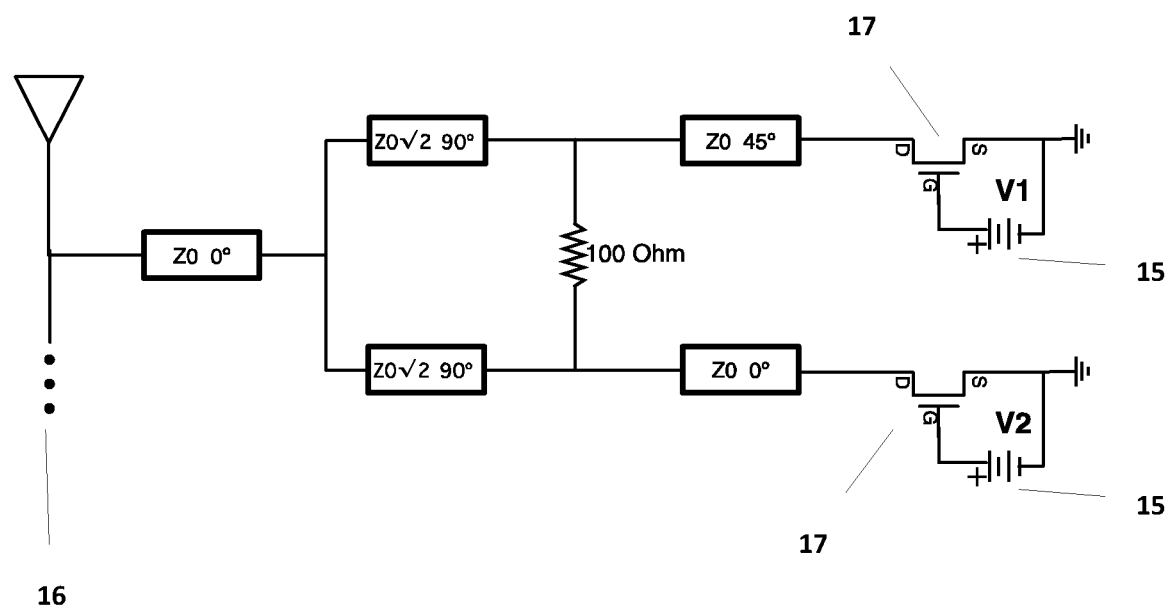
FIG. 4: Different configurations to increase the order of modulation of the passive sensor.

The embodiments herein described relate to a passive sensor system the sensors not requiring the use of cells or batteries. For such, a backscatter radio communication is used, wherein the sensor sends the received signal to the reader with less power and modulated according to the information collected by the external sensors (temperature, humidity, pressure, etc.). Simultaneously with this communication, the system also includes power emitters which continuously (or periodically, or intermittently) supply the sensors, making them fully passive without requiring the use of cells or batteries.

For the disclosure, and preferably, a 2.45 GHz frequency band for communication and a 5.8 GHz energy transfer are considered. It is to be noted that for both communication and wireless energy transfer, any other adequate frequency band could be considered. The passive sensor has an antenna (13) and two impedance matching networks (7) and (8) that can be optimized for the desired frequencies, has one or more semiconductors (6) allowing low-power backscatter communication. The voltages controlling the semiconductors (12) are provided by the microcontroller (14) and this is fed continuously by the energy emitters. The passive sensor has a voltage multiplier (9) for converting the electromagnetic energy into electrical energy, followed by a voltage regulator (10) in order to maintain a controlled voltage level. The regulated voltage (11) powers the microcontroller in a continuous manner.

In order to increase the modulation order of the backscatter communication, the sensor may include one or more semiconductors (17) which are independently controlled (15) by the microcontroller. The sensor has an impedance matching network, voltage multiplier and voltage regulator (16).

Switching on and off of the semiconductors, at certain times, allows the reader to decode and thus read the data transmitted by the sensors. Applying different voltages in each of the semiconductors results in different types of modulations.

This disclosure finds applicability in scenarios where obtaining interior or exterior location of objects is desired. It can be used in agricultural environments to control soil moisture and can be used for access control such as in car parks. The sensor can be embedded in locations where replacing batteries can be difficult or impossible.

It can also be applied inside buildings and houses for the control of temperature and humidity, allowing the regulation thereof to the desired levels.

The term "comprising" whenever used in this document is intended to indicate the presence of stated features, integers, steps, components, but not to preclude the presence or addition of one or more other features, integers, steps, components or groups thereof. The disclosure should not be seen in any way restricted to the embodiments described and a person with ordinary skill in the art will foresee many possibilities to modifications thereof. The above described embodiments are combinable.

The following claims further set out particular embodiments of the disclosure.

The invention claimed is:

1. A passive node for a wireless sensor network comprising:
    an antenna for data communication and electromagnetic energy reception by which electrical energy for powering said node is obtained;
    two impedance matching networks attached to said antenna; and
    a data processor for receiving and/or transmitting data and arranged to be powered by the obtained electric energy;
    wherein said antenna and impedance matching networks are configured for two different frequencies, a first of the impedance matching networks being arranged for receiving electromagnetic energy emitted from an electromagnetic energy emitter and a second of the impedance matching networks being arranged for backscatter communication;
    wherein the passive node further comprises a plurality of semiconductors for modulation control of said passive node by said data processor, in balanced and out-of-phase impedance branches of said impedance matching networks attached to said antenna, respectively; and
    wherein said plurality of semiconductors are independently controllable by said data processor.

2. The passive node according to claim 1, further comprising an additional plurality of semiconductors for modulation control of said passive node by said data processor, arranged in at least two balanced impedance stages.

3. The passive node according to claim 1, further comprising a plurality of semiconductors for modulation control of said passive node by said data processor, configured to be activated at different voltages for obtaining different modulations from said semiconductors.

4. The passive node according to claim 1, further comprising a voltage multiplier configured to multiply the voltage of the obtained electric energy.

5. The passive node according to claim 1, wherein said node is a sensor node and comprises a transducer connected to said data processor.

6. The passive node according to claim 5, wherein said transducer is a temperature, humidity, pressure transducer, or combinations thereof.

7. The passive node according to claim 1, wherein the data processor is a microprocessor or a microcontroller.

8. The passive node according to claim 1, wherein said antennas and networks are configured to communicate and/or receive electromagnetic energy at 2.45 GHz or at 5.8 GHz.

9. A wireless sensor network, comprising:
    an electromagnetic energy emitter; and
    one or more passive nodes, each passive node comprising:
    an antenna for data communication and electromagnetic energy reception by which electrical energy for powering said node is obtained;
    two impedance matching networks attached to said antenna; and
    a data processor for receiving and/or transmitting data and arranged to be powered by the obtained electric energy;
    wherein said antenna and impedance matching networks are configured for two different frequencies, a first of the impedance matching networks being arranged for receiving electromagnetic energy emitted from the electromagnetic energy emitter and a second of the impedance matching networks being arranged for backscatter communication;
    wherein the passive node further comprises a plurality of semiconductors for modulation control of said passive node by said data processor, in balanced and out-of-phase impedance branches of said respective impedance matching networks attached to said antenna; and
    wherein said semiconductors are independently controllable by said data processor.

10. The wireless sensor network according to claim 9, wherein the electromagnetic energy emitter comprises a transmitting antenna with a directed transmission profile for transmitting to said passive node or nodes.

11. The wireless sensor network according to claim 9, wherein the transmitting antenna of the electromagnetic energy emitter is also a receiving antenna for data transmitted by said passive node or nodes.

12. The wireless sensor network according to claim 9, wherein the electromagnetic energy emitter is configured to emit in a continuous regime, periodical regime, or in a predetermined transmission regime.

13. The wireless sensor network according to claim 9, wherein each passive node comprises a unique identification in said sensor network.

* * * * *